United States Patent
Pankonien et al.

(10) Patent No.: US 11,226,195 B1
(45) Date of Patent: Jan. 18, 2022

(54) METHOD AND SYSTEM FOR MEASURING STRAIN IN A 3D PRINTED PART

(71) Applicant: Government of the United States, as represented by the Secretary of the Air Force, Wright-Patterson AFB, OH (US)

(72) Inventors: Alexander Pankonien, Fairborn, OH (US); Joshua Deaton, Beavercreek, OH (US); Ryan Durscher, Loveland, OH (US)

(73) Assignee: UNITED STATES OF AMERICA represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 16/404,987

(22) Filed: May 7, 2019

Related U.S. Application Data (60) Provisional application No. 62/690,400, filed on Jun. 27, 2018.

(51) Int. Cl.

| | |
|---|---|
| *G01B 11/16* | (2006.01) |
| *G06T 7/73* | (2017.01) |
| *G06T 7/00* | (2017.01) |
| *G06T 7/55* | (2017.01) |
| *H04N 5/225* | (2006.01) |
| *B33Y 50/00* | (2015.01) |
| *B33Y 80/00* | (2015.01) |
| *B29C 64/386* | (2017.01) |
| *G06T 7/90* | (2017.01) |
| *H04N 5/232* | (2006.01) |

(52) U.S. Cl.
CPC ............ *G01B 11/16* (2013.01); *B29C 64/386* (2017.08); *B33Y 50/00* (2014.12); *B33Y 80/00* (2014.12); *G06T 7/001* (2013.01); *G06T 7/55* (2017.01); *G06T 7/74* (2017.01); *G06T 7/90* (2017.01); *H04N 5/2256* (2013.01); *G06T 2207/30144* (2013.01); *G06T 2207/30164* (2013.01); *H04N 5/23203* (2013.01)

(58) Field of Classification Search
CPC ................................. G01B 11/16; G06T 7/90
See application file for complete search history.

(56) References Cited

U.S. PATENT DOCUMENTS

| | | |
|---|---|---|
| 3,462,223 A | 8/1969 | Tiemann |
| 7,036,364 B2 | 5/2006 | Swillo |

(Continued)

OTHER PUBLICATIONS

Chen, A method to transfer speckle patterns for digital image correlation, Measurement Science and Technology. 26 (2015) 095201 (pp. 1-10).

*Primary Examiner* — Zhubing Ren
(74) *Attorney, Agent, or Firm* — AFMCLO/JAZ; Matthew Fair (57) ABSTRACT

A method and system for measuring strain in a 3D printed part is disclosed herein. The printed part can be formed with internal features that can be analyzed with a digital image correlation system to determine strain levels in internal regions of the part. The features are visually identifiable due to a different color, shape, design or other visually distinguishable characteristics relative to that of the base structural material. The features can be the formed from the same material or a different material from that of the base structure material.

12 Claims, 5 Drawing Sheets

(56) References Cited

U.S. PATENT DOCUMENTS

| | | | |
|---|---|---|---|
| 9,046,353 B2 | 6/2015 | Michopoulos | |
| 2003/0178556 A1* | 9/2003 | Tachi | G06F 3/042 |
| | | | 250/227.11 |
| 2011/0129237 A1 | 1/2011 | Abad | |
| 2011/0243401 A1* | 10/2011 | Zabair | G06T 7/0012 |
| | | | 382/128 |
| 2012/0176629 A1 | 7/2012 | Allen | |
| 2013/0063570 A1* | 3/2013 | Michopoulos | G01B 11/165 |
| | | | 348/47 |
| 2013/0202192 A1* | 8/2013 | Telfer | F01D 5/00 |
| | | | 382/154 |
| 2016/0275688 A1* | 9/2016 | Chiang | G01B 11/16 |
| 2018/0252515 A1* | 9/2018 | Germann | F01D 21/003 |
| 2018/0376067 A1* | 12/2018 | Martineau | G06T 7/70 |
| 2019/0212130 A1* | 7/2019 | Wang | G06T 7/521 |

\* cited by examiner

METHOD AND SYSTEM FOR MEASURING STRAIN IN A 3D PRINTED PART

CROSS-REFERENCE TO RELATED APPLICATIONS

This application claims the benefit of U.S. Provisional Application No. 62/690,400 filed on Jun. 27, 2018 and the contents of which are incorporated by reference herein.

RIGHTS OF THE GOVERNMENT

The invention described herein may be manufactured and used by or for the Government of the United States for all governmental purposes without the payment of any royalty.

TECHNICAL FIELD

The present disclosure generally relates to a method and system for measuring surface and internal subsurface strains in a 3D printed structure, and more particularly, but not exclusively to non-contact measurement of strain fields at various locations throughout an internal portion of the printed structure.

BACKGROUND

Traditional strain measurement techniques require strain gages and other instrumentation that is mechanically fastened to a surface of a structure. Strain can be determined at the surface of the structure when the structure is placed under a stressed or a loaded condition, however direct measurement of subsurface strain cannot be achieved. Furthermore, for some types of applications such as elastomeric material applications, strain gage instrumentation can restrain or otherwise interfere with the stress loading on the structure which can cause errors in strain measurement. Existing systems have other shortcomings, drawbacks, and disadvantages relative to certain applications. Accordingly, there remains a need for further contributions in this area of technology.

SUMMARY

One embodiment of the present disclosure includes a unique system and method for measuring strain in a 3D printed part. Other embodiments include apparatuses, systems, devices, hardware, methods, and combinations wherein a structure is printed with a base material that is at least partially transparent or translucent with reference features that are visibly distinguishable from the base material. A digital image correlation system can measure strain within the structure based on the position of the reference features. Further embodiments, forms, features, aspects, benefits, and advantages of the present application shall become apparent from the description and figures provided herewith.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The present disclosure is directed to a non-contact system and method for measuring strain in a structure formed by an additive manufacturing process such as 3D printing. A pattern of high-contrast color or other distinguishing feature(s) can be formed into portions of a 3D-printed structure or part to provide a baseline reference for the disclosed system such that measurement of strain or displacement in the part via a Digital Image Correlation (DIC) technique can be performed. DIC is common non-contact, optical measurement technique that tracks correlations in contrast patterns on a test structure in static and dynamic applications. The method has been shown to measure contour, deformations, vibrations, and strains at micro and macro scales as one skilled in the art readily understands. Conventionally, DIC utilizes a multi-camera system to track applied or naturally occurring patterns on the surface of the test articles.

The system and method disclosed herein predetermines the size and location of each feature (sometimes called a "speckle") and propagates the feature(s) into a part during the manufacturing process (e.g. during 3D-printing) such that the part is ready for measurement as soon as it has been finished. This technique ensures measurement reproducibility without compromising the material properties of the part. The system and method enables a prescribed speckle pattern to be incorporated within a host 3D printed component so as to enable strain field measurement of the part via DIC processing without additional post-processing steps.

In some forms the resolution of the printer, the scale of the area to be measured, and the resolution of the measurement equipment can be input into the DIC software to provide a desired accuracy of strain measurement. The calculations and randomization of the speckle pattern can be provided via an algorithmic geometric framework. The calculations and randomization of the speckle pattern can be provided via a parametric geometric framework. The framework consists of a scriptable geometry generation engine that algorithmically creates the randomized speckle pattern within the printable part based on the desired strain field resolution. Additionally the framework is capable of specifying the locations for the speckles based on an analysis-oriented polygonal mesh to better correlate simulated results with experiments.

In some forms, the features can be formed as any n-order polygonal prism, which reduce computational load and image file size associated with other types of geometry, for example a circular feature could rather be represented by a triangle, which would reduce the resultant mesh size by reducing the number of faces to be tessellated, describing the object. Additionally, this ability permits improved linkage between the analysis of 3D-printed structures by permitting more direct linkage between the computational mesh and the experimentally-measured strain. The features can be tailored to printer specific parameters, such as the opacity of the host or base material so that the effects of light diffusion can be minimized. For example, the host material can be replaced by clear plastic of similar material stiffness so that patterns within the part can be viewed more easily. Additionally, by varying the opacity of the structure in which these features are embedded (for example, as is possible in multi-material plastics) measurement of subsurface internal strain fields can be made.

De-bonding of the printed layers can sometimes occur within the printed structure when the layers are made from different materials which can cause inaccuracies in strain measurement. The disclosed system and method contemplates using the same materials for both the base part and the features, thus eliminating potential de-bonding issues. However, it should be understood that in some embodiments, different materials may be utilized for the base part and the features when de-bonding is less likely due to the shape and the expected loading conditions on a particular structure.

A plurality of different plastic and elastomeric materials may be used with the strain measurement system. By way of example and not limitation, representative material properties can include a Young's Modulus ranging from approximately $3 \times 10^9$ Pascals to approximately $5 \times 10^5$ Pascals and a density ranging from approximately 1.18 grams/cubic centimeter to approximately 1.13 grams/cubic centimeter. A change in stiffness of almost 4 orders of magnitude can be made with less than 5% variation in density. The aerospace and biomedical fields are just two examples of potential applications that would advantageously benefit from the strain measurement system disclosed herein. Exemplary forms include systems and methods to quantify aero-elastic wing stress loading or analyze damage done to an artificial human organ during a surgical operation.

The method and system operates to 1) directly control the feature pattern in the printed part; 2) form internal feature patterning within the printed part which, in conjunction with clear, transparent and/or translucent base material permit the measurement of internal strain fields in a loaded and/or unloaded condition; and 3) measure strains in the printed part immediately after the part is finished, whether or not external loading has been applied.

In some forms, computational algorithms for the digital image correlation system (DICS) can automatically generate the required feature patterns that are tailored to both the printing machine and camera optics. A feature pattern with predetermined characteristics such as size, shape, spacing, orientation and/or randomness that match both the capabilities of the printer and the optics of the DIC setup is applied in the area of interest of a 3D printed part. The control system may determine and/or provide similar command inputs to the printer to enable such patterning as a pre-printing treatment of the data from the host part. The control system can operate with the printer software in some embodiments and can be imbedded with the printer in other embodiments. The digital camera has a resolution sufficient to appropriately resolve the contrast between the "speckles" and the space between them. This resolution can be determined via the appropriate strain field resolution, which the spacing between speckles, and subsequently the facet size. The facet size is then the ratio of the resolution of the camera, over the field of view of the image. Thus the resolution of the camera is determined by the particular application. However a resolution typical of 2 Megapixels is typically sufficient for benchtop testing. Additionally, the camera in many forms can support image file export (e.g. png, tiff, raw) for subsequent analysis. Further, the camera(s) can be remotely, time-accurately triggered for correlation with additional measurement techniques (e.g. a load cell).

3D-printed structural prototypes or demonstrators can be used to reduce the cost of validating the design of a structural component. Often a newly designed part requires multidisciplinary analysis, optimization (MDAO) tools and verification testing. By using the prototype techniques disclosed in the present application, iteration time associated with "one-off" test articles that capture complex multi-physics phenomena, such as wing flutter can be reduced. The MDAO technique permits validation of rapid parametric generated designs with low-cost parametric test articles. Beyond the immediate optimization-focused benefits of parametric geometry description, the system and method shows that coupling scripted geometry generation and printable stiffness-independent material properties, such as transparency and color, can create new techniques that further enable rapid structural validation of simulation techniques. With parameters constrained by printer and measurement resolution, a randomized speckle pattern can be printed directly into a part for digital image correlation (DIC) without additional post-fabrication steps. Conventional creation of the required speckled, contrast pattern on the surface of the test article is often a post manufacturing step where a common means of creating this pattern is through the randomized application of paint droplets to the surface, often by hand. This technique has four notable drawback: 1) by its very nature the speckle pattern is non-deterministic leading to unrepeatable patterns between tests which limits correlations with simulated results; 2) delamination can occur between the thin paint film and a highly strained material leading to inaccurate results or complete failure to obtain any results; 3) the added speckle layer of can add significant stiffness to thin test articles; and 4) the measurement plane is limited to surface only.

The computational complexity of the geometric description of the printed component increases as the speckle pattern increases in complexity. Therefore it can be advantageous to reduce the complexity where possible. In some forms, the speckle features can be notionally defined as cylindrical features in the DIC pattern. These "cylindrical" patterns can be discretized into an n-sided polygon prism for ease of computational power. Where n can range from 3 to 1000 or more with 100 being a typical nominal setting. For file export to a multi-material printer, it may be desired to have separate geometry files describing the two desired colors conforming to the current file standard however this may not be the case in some instances. Typical Digital Image Correlation software can track a projection of the feature on the appropriate pixels, on the order of 5 points per feature when recreating the strain field. This fact is largely irrelevant for conventional speckle patterning where aerosol particles naturally form circular patterns. However, for the purpose of reducing computational complexity, patterning lower-order polyhedrons that meet the minimum requirement of the application (i.e. pentagons rather than "circles") could further reduce the build-time as well as resultant file size.

Figure 1:
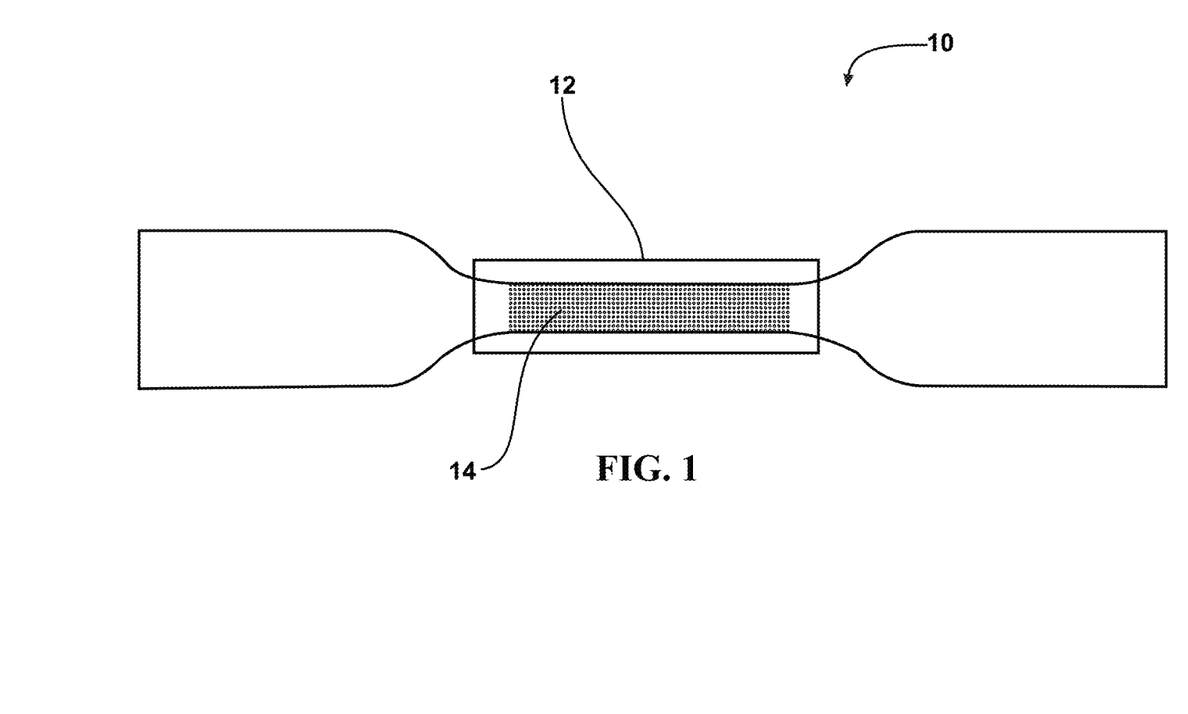
FIG. 1 is a top view of an exemplary structure with printed features according one embodiment of the present disclosure.
Figure 2:
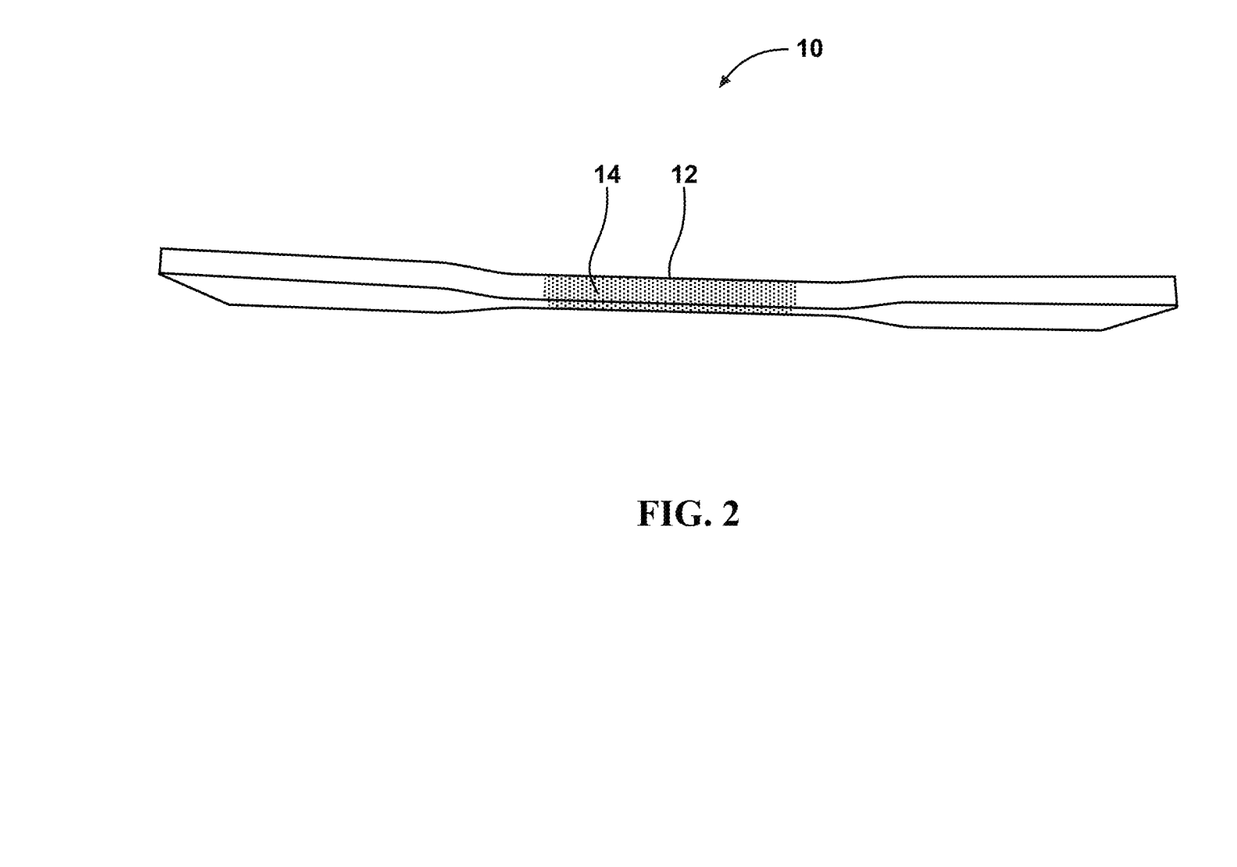
FIG. 2 is a side perspective view of an exemplary structure of FIG. 1.

Referring now to FIG. 1, an exemplary printed structure 10 is illustrated in a form of a "dog-bone" test specimen. It should be understood that that the printed structure is not limited to the illustrative embodiment shown in FIG. 1, but on the contrary can be of any form conducive to measuring strain by the methods and systems disclosed herein. The printed structure 10 incudes a feature or speckle region 12 wherein a plurality of features sometime referred to as speckles or speckle features 14 are printed in desired locations throughout the region 12. FIG. 2 shows a side view of the printed structure 10. As illustrated, the speckle features 14 can be printed anywhere throughout the structure 10 such that the subsurface regions can be defined by speckle features 14 and patterns as desired. The speckle features 14 can be the same size, shape and/or color throughout the speckle region 14 or alternatively, the size, shape and/or color may vary at different locations and subsurface layers.

Figure 3:
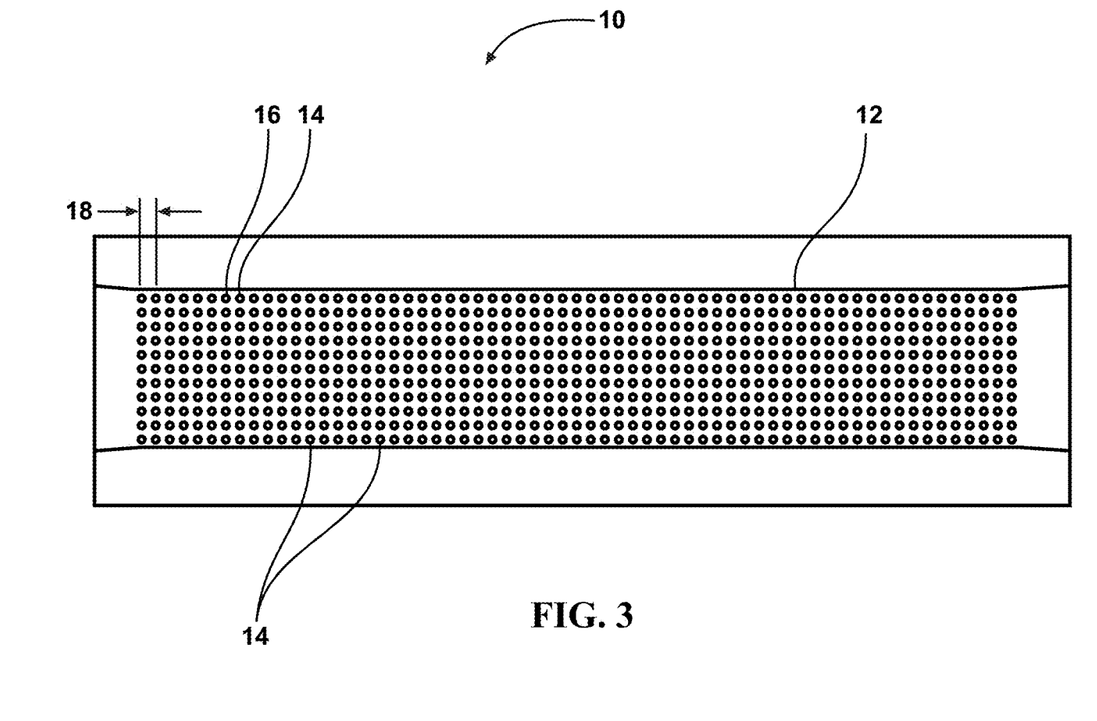
FIG. 3 is an enlarged view of a speckle feature region formed with the structure of FIG. 1.

FIG. 3 shows an enlarged view of a portion of the speckle region 12 with speckle features 14 positioned in a single plane or layer of the structure 10. Each speckle feature 14 can be independently defined by a size, a shape and/or a color so as to provide a plurality of reference locations for the DICS to determine strain within the structure 10. In some forms all of the speckle features 14 can be substantially identical to one another. In other forms some of the speckle features may be identical while others are different. In yet other forms each of the speckle features 14 can be different from one another. A distance 18 is defined between adjacent speckle features 14. In some forms, the distance 18 may be identical throughout the speckle region 12. In some forms, the distance 18 may be varied throughout the speckle region 12.

Figure 4:
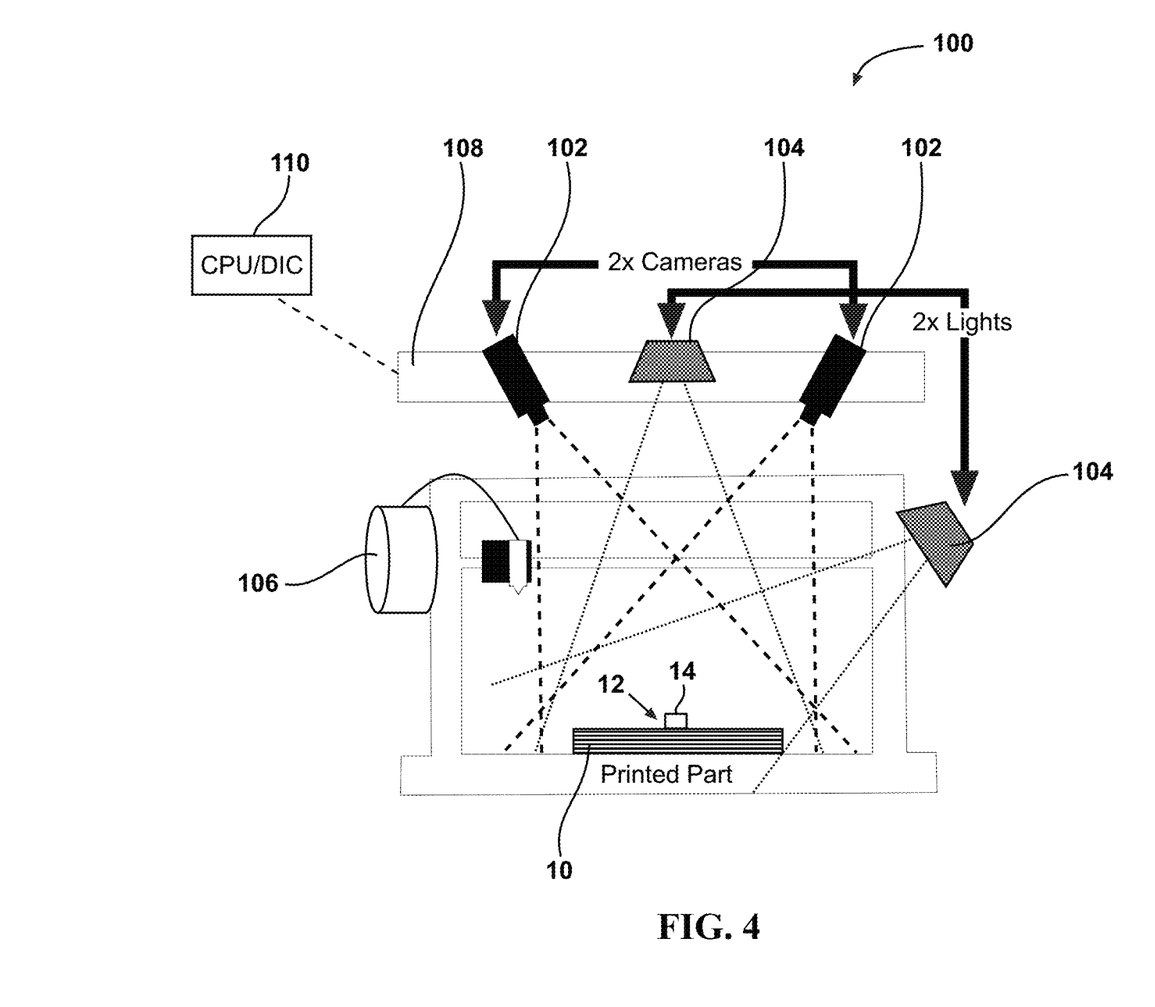
FIG. 4 is a schematic view of a system used to measure strain in a printed part using visual imaging techniques.

FIG. 4 is a schematic illustration of a system 100 operable for measuring a strain in a printed structure 10. The system can include at least one camera 102 operable for capturing a digital image of the speckle region 12 of the printed structure 10. In some forms, more than one image from different vantage points may be required to properly characterize the strain within the printed structure 10. This can be done by moving a single camera 102 to different locations or by having a plurality of cameras 102 at prepositioned at desired locations. One or more light sources 104 are used to illuminate the printed structure 10 in a manner that will facilitate capturing visible images of the speckle features 14 within the speckle region 12. An actuator control system 106 is operable to move certain elements of the system 100 to facilitate the manufacturing and/or the subsequent strain analysis of the printed component 10. The actuator control system 106 is shown as a simplified schematic and many components are not shown, however one skilled in the art would readily understand how to implement such a system 106. An interface 108 operably connects a computer system 110 with components of the system 100 to provide control of the operation of the components therein to obtain images capable of defining internal strain within the printed component 10. The computer system 100 includes various components such as central processing unit(s) (CPU), memory, permanent data storage, data input/output systems, DIC, etc).

Figure 5:
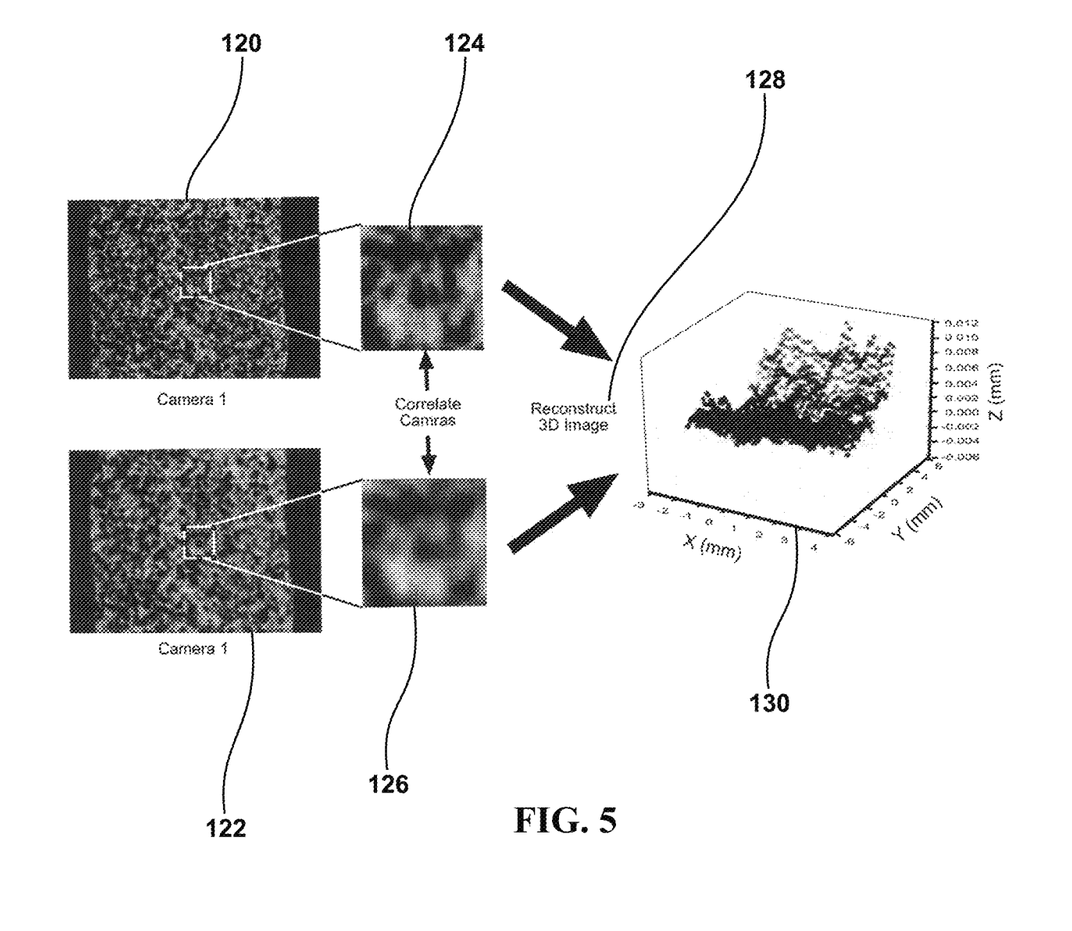
FIG. 5 shows graphical images captured by a camera and a reconstructed image showing reference features that are used by a digital image correlation system to analyze and determine strain within the structure of FIG. 1.

Referring now to FIG. 5, a graphical illustration of how the DIC system operates to determine strain within a printed component is depicted. A first image 120 is taken of speckle region 14 and a second image 122 is taken of the same region at a different time or loading condition of the structure 10. An enlarged view 124 of a portion of the first image 120 and an enlarged view 126 of a portion of the second image 122 are correlated together and can be used to reconstruct a 3D image 128. The reconstructed 3D image 128 can be interrogated by the DIC system to define a graphical plot 130 that can be used to analyze a change in speckle feature location from the first image 120 to the second image 122. In this manner an internal strain can be determined within the structure 10.

In one aspect the present disclosure includes a system comprising: a 3D printed structure having a base material that permits light to pass through and at least one feature formed within the base material that is visibly distinguishable from the base material; an optical imaging system operable for scanning and saving an image of the structure including the at least one feature in a memory; and a control system operable for analyzing the image and determining a position of the feature within the structure and determining a strain by comparing the position of the feature relative to a baseline position.

In refined aspects the optical imaging system includes a digital image correlation (DIC) system; the optical imaging system includes a least one digital camera; the digital camera includes is remotely controlled; images taken by the camera are correlated and a 3D image is reconstructed and analyzed by the control system to determine strain within the 3D printed structure; the optical imaging system includes at least one light source; the feature is defined by a different color and/or opaqueness relative to the base material; the feature is a plurality of features; at least one of the plurality of features is defined by a different property from that of other features; the different property includes at least one of size, shape and color; the control system is embedded within the printer; and the at least one feature is formed internal to 3D printed structure and strain is determined at the internal location of the feature.

In another aspect the present disclosure includes 3D printed part comprising: a base structure printed from a material that permits light to pass therethrough; at least one speckle feature printed internal to the base structure, the speckle feature being visibly different from the base structure; wherein the speckle feature moves from a first position to a second position when a load is placed on the 3D printed part; and wherein an internal strain is determined based on the change in position of the speckle feature.

In refined aspects the base structure and the at least one speckle feature are formed from the same material; the difference between the base structure and the at least one speckle feature includes a color, a shape, or a translucency level; the at least one speckle feature includes a plurality of speckle features and wherein at least one of the speckle features is defined at least partially with a different characteristic from another speckle feature; the different characteristic of the speckle features includes at least one of color, shape, size and translucency; and the base structure is a component for one of an air vehicle, a space vehicle, a land based vehicle, a water vessel and/or a human organ application.

In a another aspect, the present disclosure includes a method comprising: forming, with an additive manufacturing process, a structure with visible internal features; capturing a first digital image of the structure in a first condition; capturing a second digital image of the structure in a second condition; correlating the first and second digital images with a digital image correlation system; reconstructing a digital 3D image from the correlated first and second digital images; and determining a strain within the structure by analyzing the relative position of the internal features between the first condition and the second condition.

In refined aspects, the method includes applying a first external load to the structure at the first condition and applying a second external load different from the first external load at the second condition, and wherein the external load at the first condition and/or the second condition is zero.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A system comprising:
   a 3D printed structure having a base material that permits light to pass through and at least one feature formed internal to the base material that is visibly distinguishable from the base material;
   an optical imaging system operable for scanning and saving an image of the structure including the at least one feature in a memory;
   a control system operable for analyzing the image and determining a position of the feature within the structure and determining an internal strain of the 3D printed structure by comparing a measured position of the feature relative to a measured baseline position;
   wherein the structure and the at least one feature are formed together via a 3D printing procedure; and
   wherein the at least one feature is precisely placed at a predetermined location within the structure during print fabrication.

2. The system of claim 1, wherein the optical imaging system includes a digital image correlation (DIC) system.

3. The system of claim 2, wherein the optical imaging system includes a least one digital camera.

4. The system of claim 3, wherein the digital camera includes is remotely controlled.

5. The system of claim 1, wherein images taken by the camera are correlated and a 3D image is reconstructed and analyzed by the control system to determine strain within the 3D printed structure.

6. The system of claim 1, wherein the optical imaging system includes at least one light source.

7. The system of claim 1, wherein the feature is formed from the same material as the base material and is defined by a different color and/or opaqueness relative to the base material.

8. The system of claim 1, wherein the feature is a plurality of features.

9. The system of claim 8, wherein at least one of the plurality of features is defined by a different property from that of other features.

10. The system of claim 9, wherein the different property includes at least one of size, shape and color.

11. The system of claim 1, wherein the control system is embedded within the printer.

12. The system of claim 1, wherein the at least one feature is formed internal to 3D printed structure and strain is determined at the internal location of the feature.

* * * * *